(12) United States Patent
Kim

(10) Patent No.: US 8,396,017 B2
(45) Date of Patent: Mar. 12, 2013

(54) APPARATUS AND METHOD FOR FILTERING BROADCAST MESSAGE

(75) Inventor: Hoe-Won Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1507 days.

(21) Appl. No.: 11/776,244

(22) Filed: Jul. 11, 2007

(65) Prior Publication Data

US 2008/0049656 A1 Feb. 28, 2008

(30) Foreign Application Priority Data

Jul. 12, 2006 (KR) .................. 10-2006-0065229

(51) Int. Cl.
*H04H 20/71* (2008.01)
(52) U.S. Cl. ..................................... 370/312; 455/435.1
(58) Field of Classification Search ............... 455/343.2, 455/435.1, 466, 517, 518, 519; 370/312; 709/207
See application file for complete search history.

(56) References Cited

U.S. PATENT DOCUMENTS

| | | | | |
|---|---|---|---|---|
| 6,549,775 | B2 * | 4/2003 | Ushiki et al. | 455/432.1 |
| 7,295,827 | B2 * | 11/2007 | Liu et al. | 455/343.2 |
| 7,428,580 | B2 * | 9/2008 | Hullfish et al. | 709/207 |
| 2002/0037736 | A1 * | 3/2002 | Kawaguchi et al. | 455/518 |
| 2005/0036471 | A1 * | 2/2005 | Singh et al. | 370/338 |

FOREIGN PATENT DOCUMENTS

| | | |
|---|---|---|
| JP | 2003-008625 | 1/2003 |
| JP | 2003-339077 | 11/2003 |
| KR | 1020060030001 | 4/2006 |
| WO | WO 03/058989 | 7/2003 |

* cited by examiner

*Primary Examiner* — Charles Appiah
*Assistant Examiner* — Alexander Yi
(74) *Attorney, Agent, or Firm* — The Farrell Law Firm, P.C.

(57) ABSTRACT

An apparatus and a method for filtering a broadcast message in a wireless network access equipment is discussed. The method includes searching for a registered communication terminal that should respond to a received broadcast message; checking whether the received broadcast message forwarding to the searched communication terminal requires a response; and transmitting a response instead to the communication terminal when the received broadcast message requires a response.

16 Claims, 8 Drawing Sheets

APPARATUS AND METHOD FOR FILTERING BROADCAST MESSAGE

PRIORITY

This application claims priority under 35 U.S.C. §119 to an application filed in the Korean Intellectual Property Office on Jul. 12, 2006 and assigned Serial No. 2006-65229, the contents of which are incorporated herein by reference.

BACKGROUND OF THE INVENTION

1. Field of the Invention

The present invention relates generally to broadcast message filtering, and, in particular, to an apparatus and method for reducing power consumption of a communication terminal by implementing a response to a broadcast message forwarding to a communication terminal complying with a specific wireless protocol.

2. Description of the Related Art

Mobile communication systems have rapidly evolved since their introduction. At present, mobile communication systems are attempting convergence with a communication system based on a heterogeneous wireless technology.

An example of Unlicensed Mobile Access (UMA) is shown in FIGS. 1A and 1B, which, illustrate a conventional network using UMA.

Referring to FIG. 1A, in the UMA, a UMA Network Controller (UNC) 101 provides access between a communication system based on a different wireless technology (e.g., Wi-Fi) and a mobile communication system. Signaling of the UMA can use signaling of a mobile communication system. A communication terminal can selectively use a mobile communication system or a different wireless technology. In detail, in the UMA system, a communication terminal can automatically detect an area based on a different wireless protocol and then connect with Internet through the UNC 101. GSM voice call and all GSM/GPRS data application service can be provided to a communication terminal 102.

Conventional wireless communication technology, including Wi-Fi, has been applied to various digital home equipment, such as notebook computers, and allows for communication and Internet connection between them. Most equipment is commonly used in a home or an office and is directly connected to an external power supply and thus is to some degree, independent from power consumption constraints. However, as such a wireless communication technology is applied to a communication terminal, the amount of consumption power will greatly influence stand-by time. Thus, power consumption savings in a communication terminal is becoming a key technology.

In Wi-Fi systems, a communication terminal receives only a beacon channel at a predetermined Traffic Indication Map (TIM) period using a power save mode without receiving all traffic from the Access Point (AP). Thus, it can check whether there is information to be received using information on the beacon channel.

In this case, AP stores operation information in an internal buffer and involves transmission information on a target communication terminal in the beacon channel. This method can reduce, though sometimes causing reception delay, power consumption because it does not perform unnecessary reception work compared to a method in which a communication terminal receives all data.

Wireless fidelity MultiMedia (WMM), which evolved from Wi-Fi, can reduce power consumption using an Unscheduled Automatic Power Save Delivery (U-APSD) technology. The U-APSD, which is a method for enabling a periodic connection to the AP using a timer during voice telephony on the basis of a feature of periodic transmission/reception requirements, can increase available telephony time. In other words, the U-APSD enables a communication terminal to implement downlink scheduling and receive data from AP, on the basis of a repeated pattern of a beacon period. AP performs buffering for a communication terminal at a predefined beacon period and then transmits a buffered packet to a communication terminal awaken at its own period.

In a standby mode, a communication terminal identifies and receives a beacon channel at the TIM period and periodically receives even broadcast data at a Delivery Traffic Indication Message (DTIM) period. The broadcast data is used even when various types of equipment, such as notebook computers or Personal Computers (PC), exchange data with each other as in FIG. 1A. The broadcast data is used when they are assigned an Internet Protocol (IP) address using Dynamic Host Configuration Protocol (DHCP). FIG. 1B shows that various kinds of equipment that communicate with each other or are provided with Internet an service through AP installed in a home or an office.

An increase in the number of equipment results in an increased number of broadcast messages that the equipment should receive and respond to. For example, after a new notebook computer is assigned an IP address from a DHCP server, it should check whether there different equipment exist using the same IP address in a sub-network. For this, the notebook computer should inquire about whether all of the different equipment use the same IP address by a broadcast message. Equipment using the same IP address, if any, should respond to the broadcast message. Broadcast traffic such as the broadcast message does not greatly influence equipment using an external power supply, but can cause undesired power consumption and reduce stand-by time in equipment that is battery powered.

Accordingly, a demand exists for an apparatus and method for processing broadcast data to reduce power consumption and increase stand-by time.

SUMMARY OF THE INVENTION

An aspect of the present invention is to substantially solve at least the above problems and/or disadvantages and to provide at least the advantages below. Accordingly, an aspect of the present invention is to provide an apparatus and method for filtering a broadcast message.

Another aspect of the present invention is to provide an apparatus and method for reducing power consumption by responding to a broadcast message instead.

A further aspect of the present invention is to provide an apparatus and method for increasing stand-by time by responding to a broadcast message instead.

According to one aspect of the present invention, there is provided a method for filtering a broadcast message in a wireless network access equipment. The method includes searching for a registered communication terminal that should respond to a received broadcast message; checking whether the received broadcast message forwarding to the searched communication terminal requires a response; and transmitting a response instead of the communication terminal when the received broadcast message requires a response.

According to another aspect of the present invention, there is provided an apparatus for filtering a broadcast message. The apparatus includes a broadcast message processor, a keep-alive node checker and a controller. The broadcast message processor receives a broadcast message, checks the received broadcast message and decides whether to transmit a response message instead of a registered communication terminal to which the broadcast message is forwarded. The keep alive node checker checks whether there exists the registered communication terminal within a control area. The controller receives a registration message from a communication terminal, performs registration for broadcast message filtering, transmits a response message to the broadcast message instead when the broadcast message processor permits a response, and deletes registration information on the registered communication terminal when the keep-alive node checker checking that there does not exist the registered communication terminal.

According to a further aspect of the present invention, there is provided a system for filtering a broadcast message. The system includes a wireless network access equipment and a communication terminal. The wireless network access equipment performs registration for a communication terminal, filters a broadcast message for a registered communication terminal, responds to the broadcast message instead when requiring a stead response, and transmits only a broadcast message, which should be necessarily received by the registered communication terminal, to the registered communication terminal over a data channel. After being registered by the wireless network access equipment, the communication terminal receives only a selective broadcast message over a data channel without receiving a broadcast message over a broadcast channel.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail. The present invention is applicable to not only a mobile communication system but also any system using a broadcast message. A description of an apparatus and method for filtering a broadcast message according to the present invention is provided below.

The present invention relates to an apparatus and method for minimizing power consumption between an Access Point (AP) and a dedicated or complex communication terminal based on Unlicensed Mobile Access (UMA), IP Multimedia Subsystem-Voice Over IP (IMS-VoIP) and Wireless Fidelity (Wi-Fi) technologies in order to maximize a stand-by time of the communication terminal.

Figure 1A:
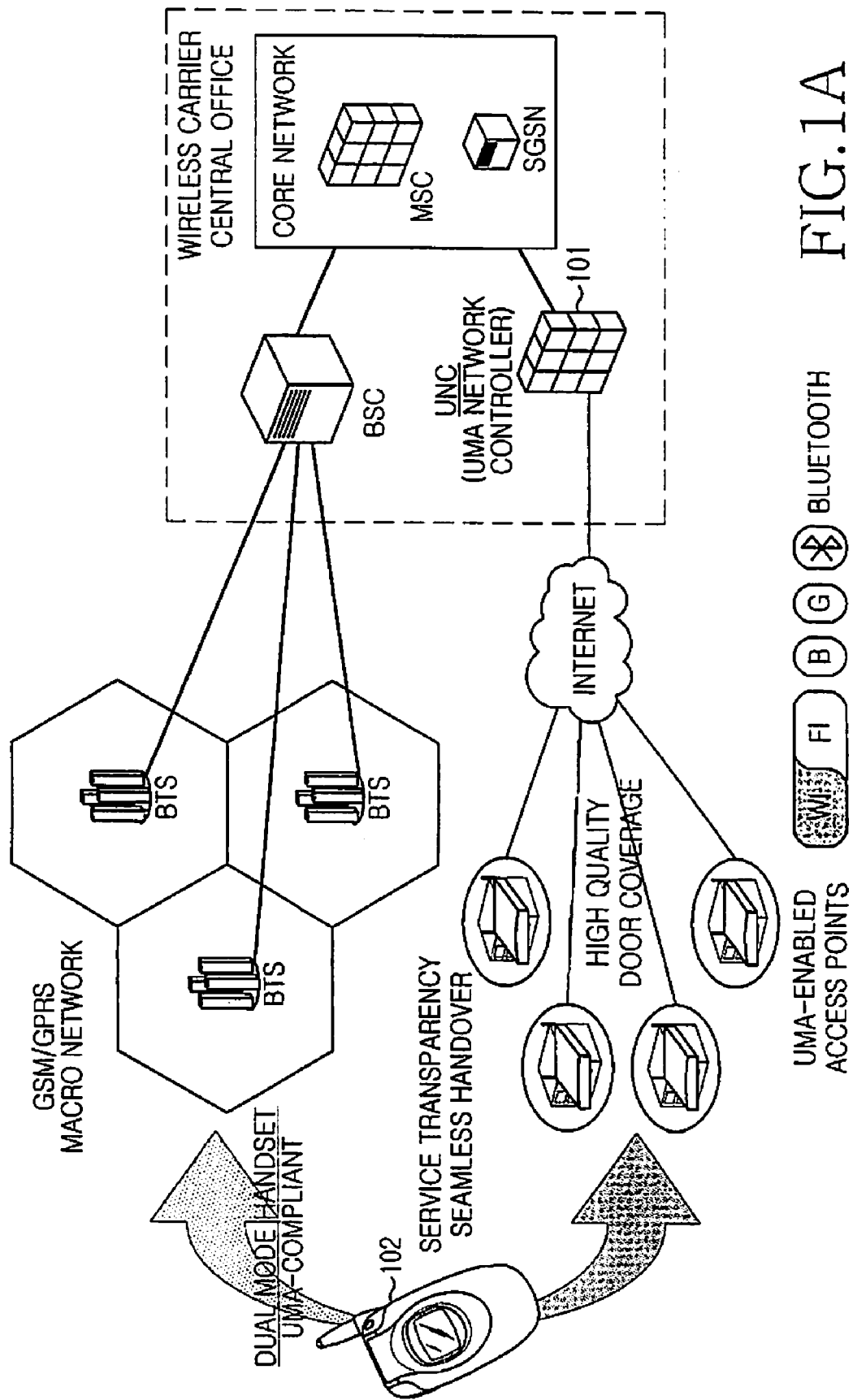
FIGS. 1A and 1B illustrate a conventional network using Unlicensed Mobile Access (UMA)
Figure 1B:
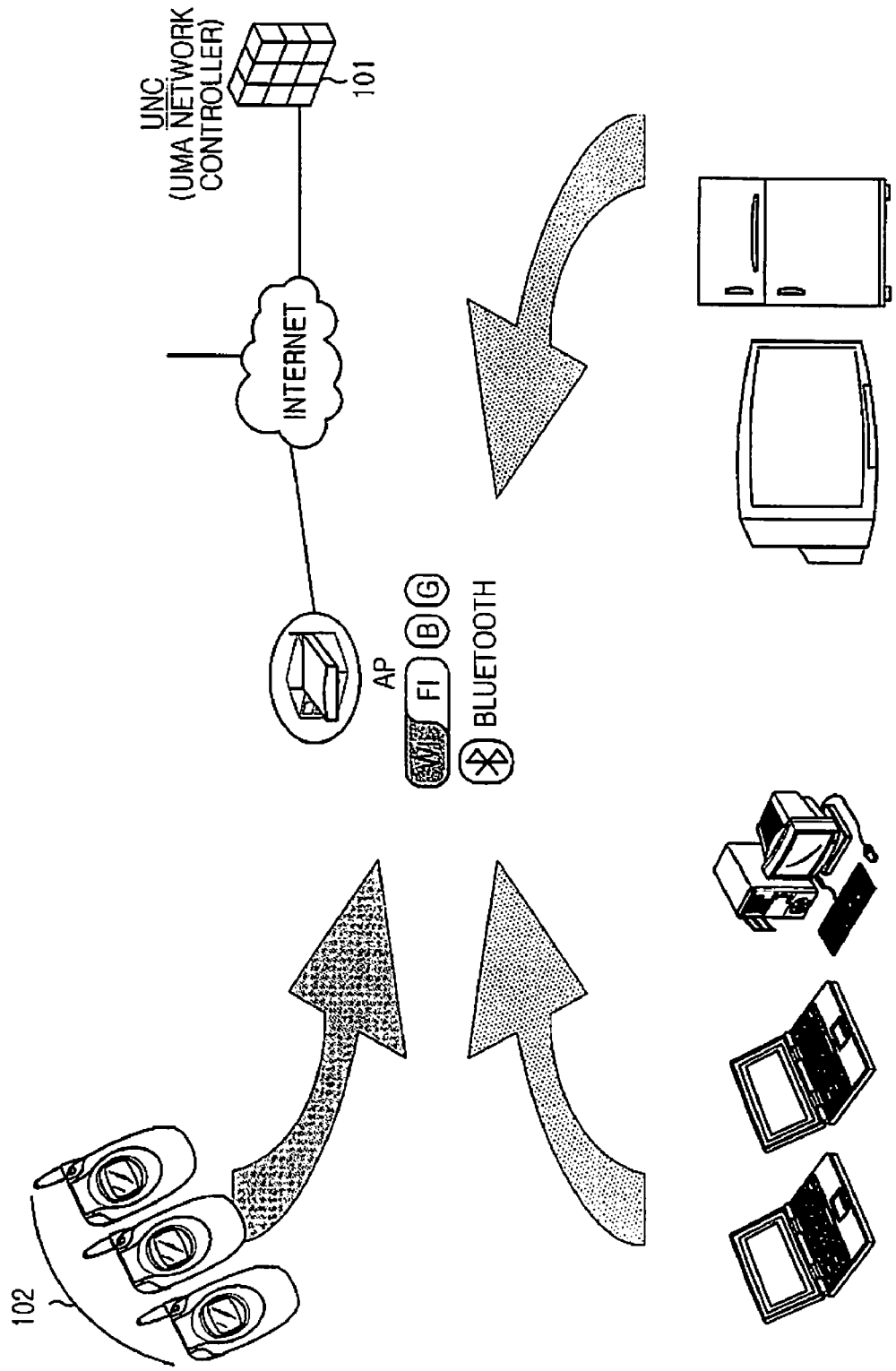
Figure 2:
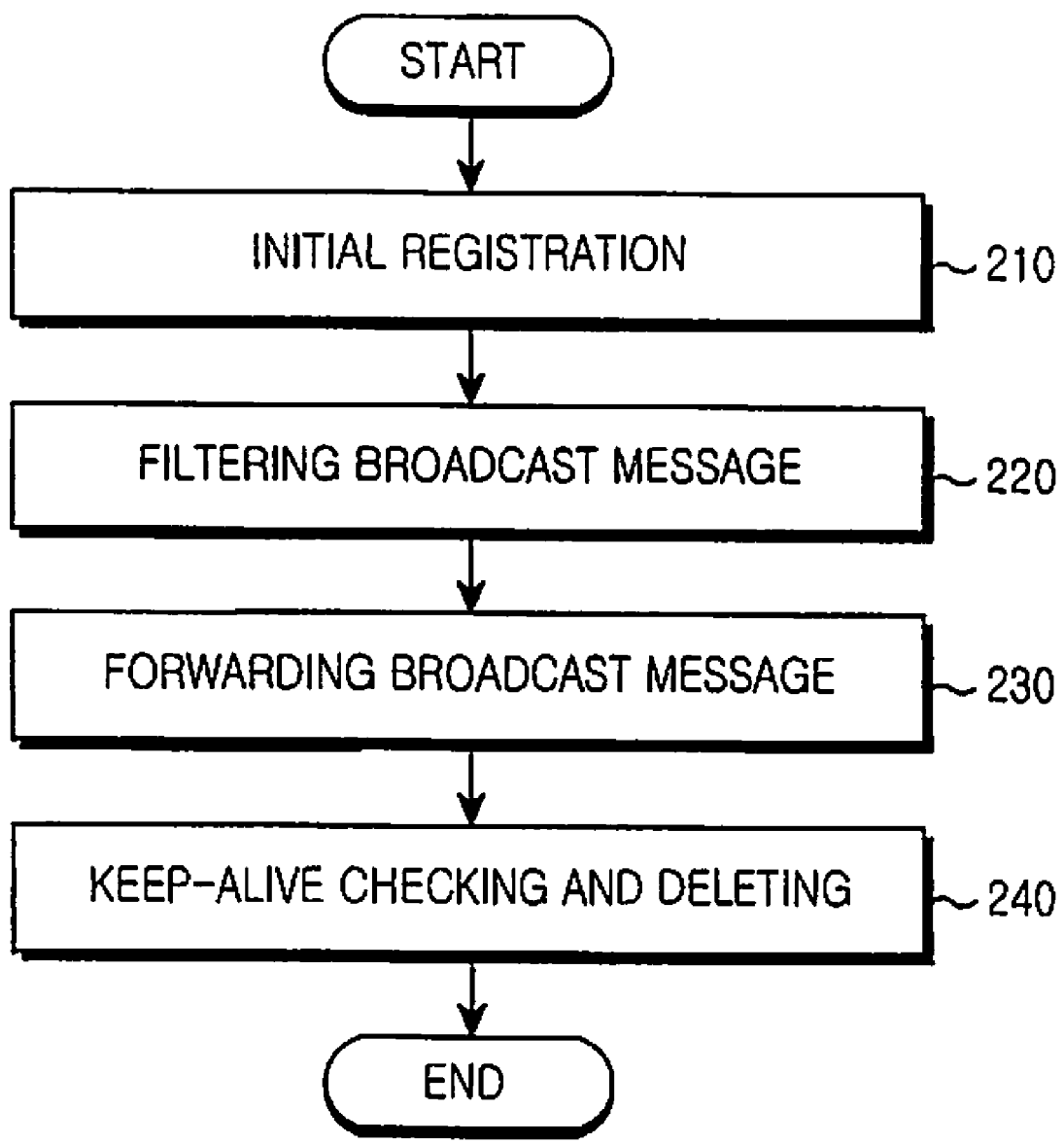
FIG. 2 is a flowchart of a schematic procedure of filtering a broadcast message according to the present invention.

In the present invention, the procedure for filtering a broadcast message includes the following four steps, as described in. FIG. 2, which is a flowchart of a schematic procedure of filtering a broadcast message according to the present invention.

Referring to FIG. 2, in Step 210, a communication terminal implements initial registration by an Access Point (AP). The initial registration is to inform the AP whether an equipment implementing initial registration is a communication terminal using a battery and using broadcast message filtering, or is a universal terminal like a notebook computer or a Personal Computer (PC).

In Step 220, the AP filters a broadcast message. A communication terminal completing the registration of Step 210 does not receive a broadcast message at a Delivery Traffic Indication Message (DTIM) period during the broadcast message filtering process. Instead place of the communication terminal responding, the AP responds to a broadcast message according to the need for registration information.

In Step 230, the AP transmits the broadcast message to a target communication terminal over a data channel when there is a broadcast message that the communication terminal should necessarily receive.

In Step 240, when filtering a broadcast message, the AP checks whether there exists a target communication terminal by a separate method because it cannot check whether there exists a target communication terminal in a control area of the AP. A method for checking whether there exists a target communication terminal is described below. Further, the AP deletes registration information on a target communication terminal when determining that there does not exist a target communication terminal, because there is no response of the target communication terminal.

Figure 3:
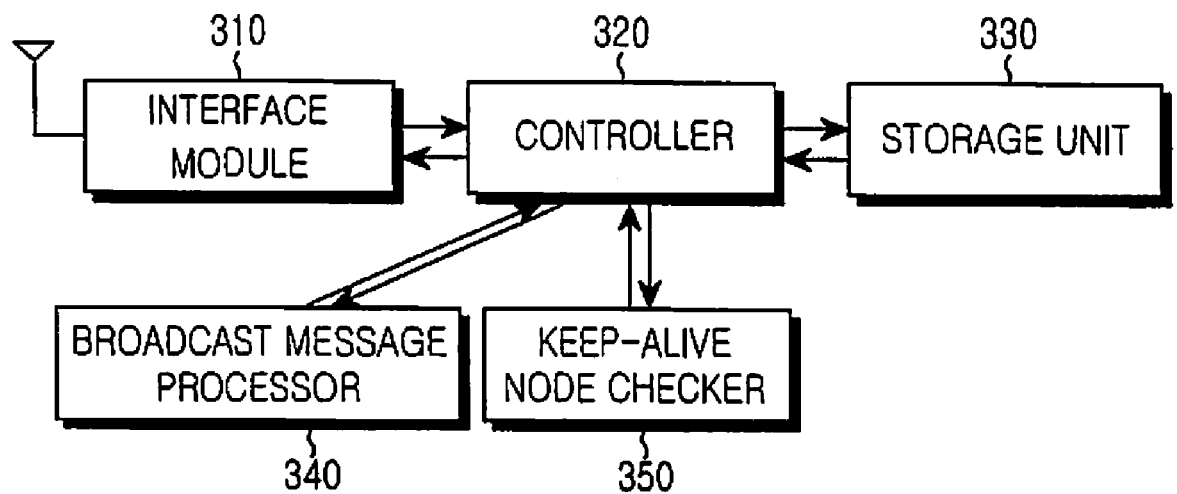
FIG. 3 is a block diagram of an apparatus for filtering a broadcast message according to the present invention.

FIG. 3 is a block diagram of an apparatus for filtering a broadcast message according to the present invention. Referring to FIG. 3, the apparatus preferably includes an interface module 310, a controller 320, a storage unit 330, a broadcast message processor 340 and a keep-alive node checker 350.

The controller 320 performs a general control for transmitting/receiving and processing data. Particularly, the controller 320 generally controls filtering of a broadcast message and checking a keep-alive node. The controller 320 provides information on a specific communication terminal to the broadcast message processor 340. The controller 320 controls the broadcast message processor 340 to provide a response or a non-response to a broadcast message for the specific communication terminal. If a response or a non-response for the specific communication terminal is received from the broadcast message processor 340, the controller 320 transmits a response message to the broadcast message through the interface module 310, depending on the response or the non-response. When the controller 320 has to transmit the broadcast message to the specific communication terminal, it transmits a received broadcast message to the specific communication terminal over a data channel without transmitting a response message instead. The controller 320 provides information on a predetermined communication terminal to the keep-alive node checker 350. The controller 320 controls the keep-alive node checker 350 to check whether there exists the predetermined communication terminal and provides the check result to the controller 320. The controller 320 deletes stored registration information on the predetermined communication terminal from the storage unit 330 when the check result received from the keep-alive node checker 350 indicates that there exists the predetermined communication terminal.

Under the control of the controller 320, the broadcast message processor 340 checks for a response or a non-response for the specific communication terminal and provides the check result to the controller 320. The keep-alive node checker 350 checks whether the predetermined communication terminal is kept alive, that is, whether there exists the predetermined communication terminal within a control area of the apparatus and provides the check result to the controller 320.

The storage unit 330 stores programs for controlling a general operation of the apparatus and temporary data generated in execution of program. Particularly, the storage unit 330 stores a DataBase (DB) for a registered communication terminal.

The interface module 310, i.e. a module for communicating with another node, includes a Radio Frequency (RF) processor and a baseband processor. The RF processor receives a signal through an antenna, converts the signal into a baseband signal, and provides the baseband signal to the baseband processor. The RF processor receives a baseband signal from the baseband processor, converts the baseband signal into an RF signal for actual in-air transmission, and transmits the RF signal through the antenna.

The controller 320 can also perform the functions of the broadcast message processor 340 and the keep-alive node checker 350, although a separately construction is shown to distinguish and describe respective functions in the present invention.

A registration procedure of the present invention is described with reference to FIG. 4, which illustrates a registration procedure according to the present invention.

Figure 4:
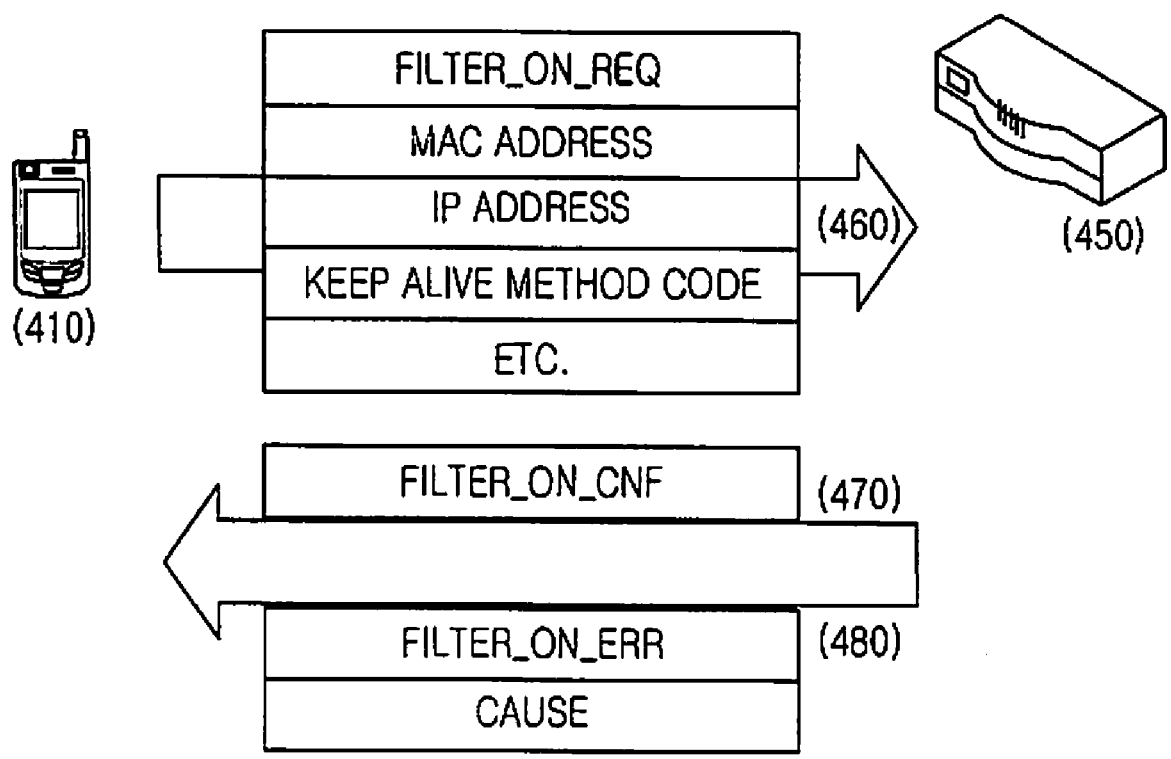
FIG. 4 illustrates a registration procedure according to the present invention.

Referring to FIG. 4, in Step 460, a communication terminal 410 transmits a message of "FILTER_ON_REQ" and requests registration for filtering a broadcast message, after connecting to an AP 450 for communication. The "FILTER_ON_REQ" message includes a Media Access Control (MAC) address of the communication terminal 410, an available Internet Protocol (IP) address, a keep-alive method code, and etc. The keep-alive method code is used for the AP 450 to check whether the communication terminal 410 exists within a control area. The AP 450 receives, stores and manages the keep-alive method code.

In Step 470, the AP 450 transmits a message of "FILTER_ON_CONF" in response to the received "FILTER_ON_REQ" message when the registration is valid. In Step 480, the AP 450 transmits a message of "FILTER_ON_ERR" when the registration is invalid. The "FILTER_ON_ERR" message includes a case when the registration is invalid.

A procedure of filtering a broadcast message in an AP according to the present invention is described below, with reference to FIG. 5, which is a flowchart of a procedure of filtering a broadcast message according to the present invention.

Figure 5:
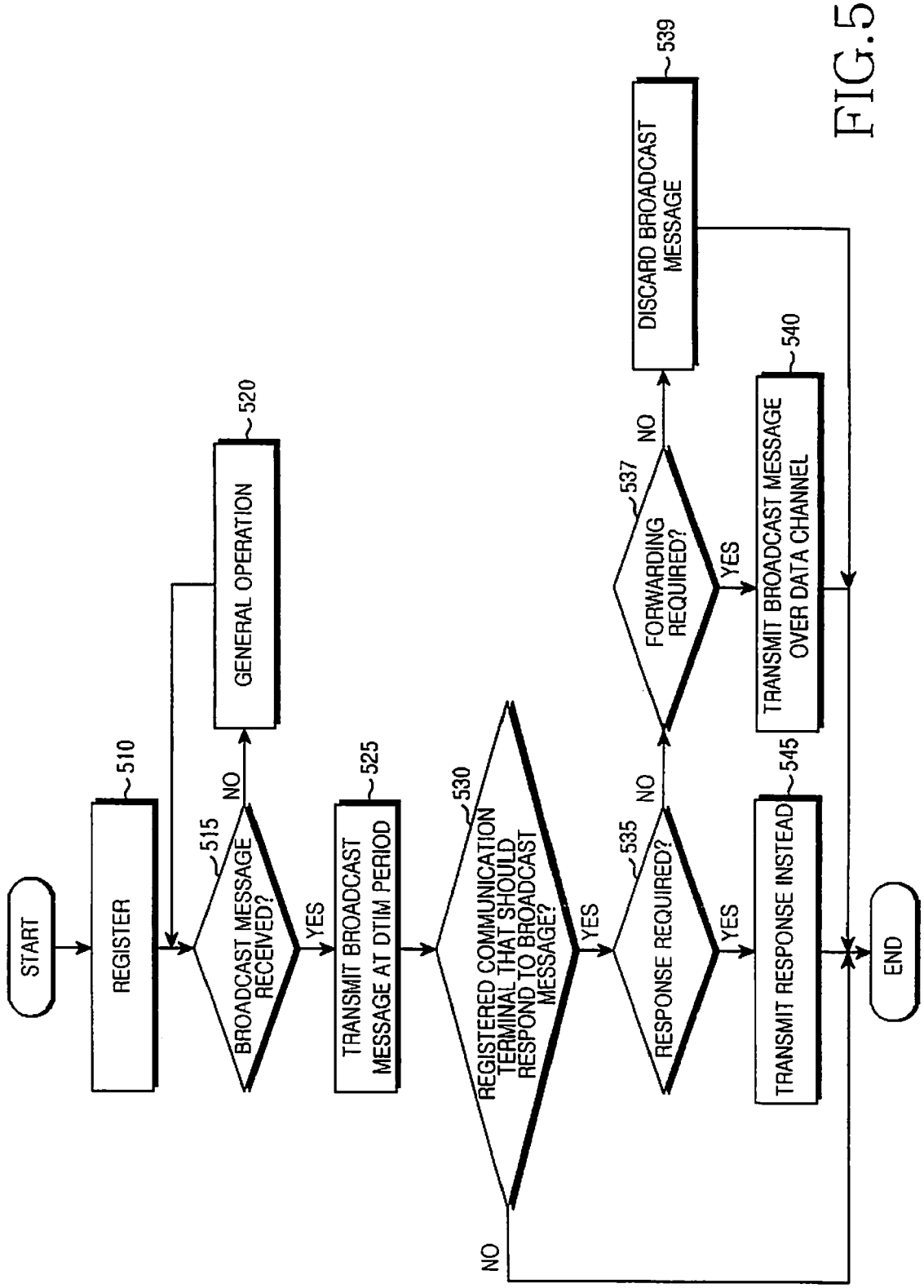
FIG. 5 is a flowchart of a procedure of filtering a broadcast message according to the present invention.

Referring to FIG. 5, in Step 510, the registration procedure of FIG. 4 is performed by a communication terminal to filter a broadcast message. After the registration of Step 510, the registered communication terminal does not receive all broadcast messages without respect to a Delivery Traffic Indication Message (DTIM) timer.

In Step 515, the AP checks whether it receives a broadcast message. In Step 520, the AP performs a general operation of inter-node data transmission or uplink and downlink data forwarding, when the broadcast message is not received in Step 515.

Otherwise, in Step 525, the AP transmits the received broadcast message at a DTIM timer period when receiving the broadcast message. In Step 525, a received broadcast message is kept intact when transmitted, for equipment not using broadcast message filtering of the present invention.

In Step 530, the AP checks whether there exists a registered communication terminal, which should respond to the received broadcast message, by searching a storage database (DB).

In Step 535, the AP checks whether a broadcast message for the searched communication terminal requires a response when it is determined in Step 530 that there exists the registered communication terminal.

In Step 545, the AP transmits a response to the broadcast message in place of the communication terminal when it is determined in Step 535 that the broadcast message requires a response. For example, where a specific equipment is assigned a specific IP address by Dynamic Host Configuration Protocol (DHCP) and then inquires whether there exists a different equipment having the same IP address by a broadcast message provided over a broadcast channel, the communication terminal cannot provide a response using the same IP address. Accordingly, the AP checks whether previously stored information (e.g., an IP address) on the communication terminal is consistent with information (e.g., an IP address) included in a requested broadcast message. The AP transmits a response to the broadcast message to the specific equipment in place of the communication terminal.

In Step 537, the AP checks whether the received broadcast message requires forwarding to the communication terminal when it is determined that the broadcast message does not require a response in the Step 535.

In Step 540, the AP transmits the received broadcast message to the communication terminal over a data channel when it is determined in Step 537 that the broadcast message requires forwarding. Otherwise, in Step 539, the AP discards the broadcast message when the broadcast message is determined not to require forwarding in Step 537.

After that, the AP terminates the procedure according to the present invention.

A description of a keep-alive checking procedure for checking whether there exists a communication terminals further described. In the present invention, when a communication terminal willfully requests disconnection, the AP deletes registration information on the communication terminal.

Figure 6:
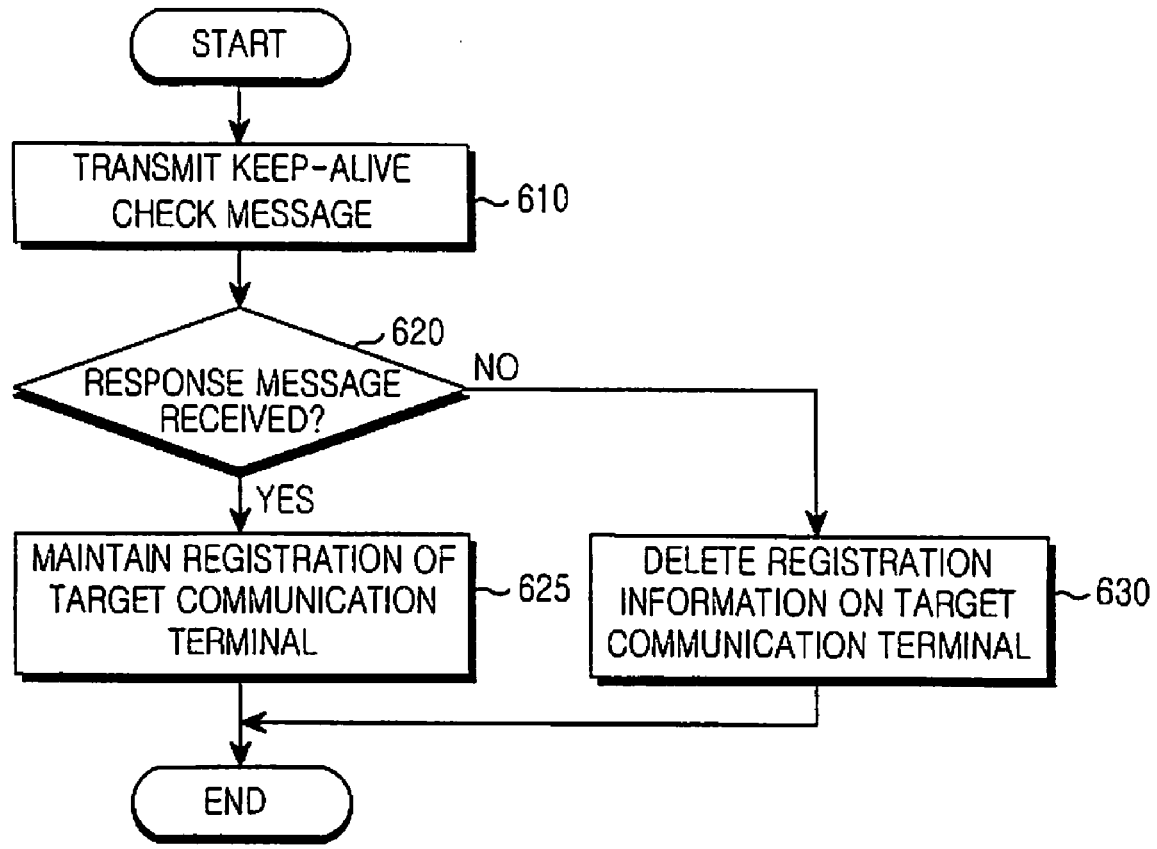
FIG. 6 is a flowchart of a procedure of checking keep-alive in an Access Point (AP) according to the present invention.

FIG. 6 is a flowchart of a procedure of checking keep-alive in an AP according to the present invention. In Step 610, the AP transmits a keep-alive check message so as to check whether there exists a specific communication terminal. In Step 620, the AP checks whether it receives a response message to the keep-alive check message. If so, the AP proceeds to Step 625 and maintains registration for the specific communication terminal.

The response message includes a keep-alive method code and thus, the AP can check that the specific communication terminal is a registered communication terminal. In other words, the AP can check that the specific communication terminal is a registered communication terminal when a keep-alive method code transmitted from the specific communication terminal upon registration is the same as a keep-alive method code included in the response message.

Otherwise, in Step 630, the AP deletes registration information on the specific communication terminal when receiving a response message to the keep-alive check message in the Step 620.

After that, the AP terminates the procedure of the present invention.

Figure 7:
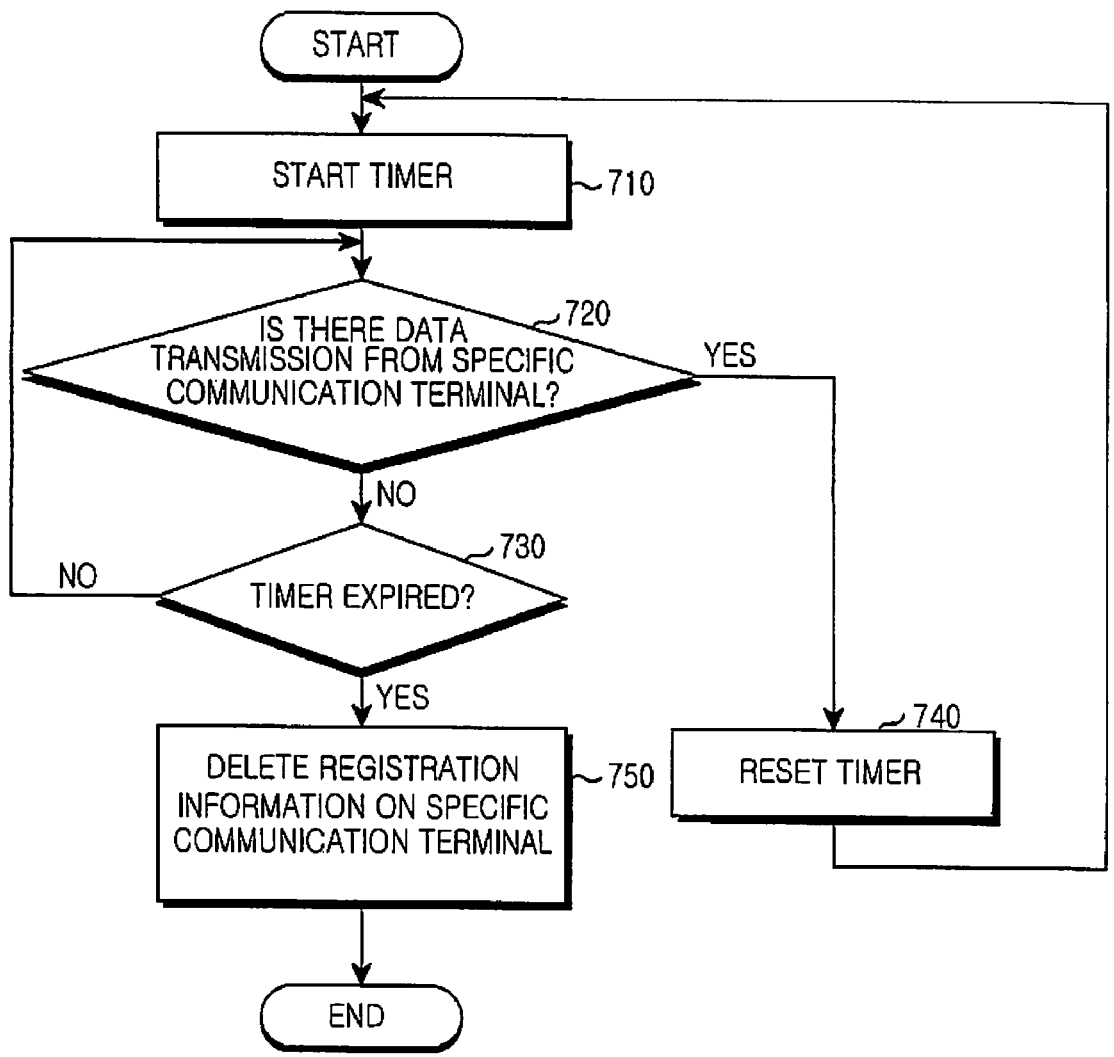
FIG. 7 is a flowchart of a procedure of checking keep-alive in an AP according to the present invention.

FIG. 7 is a flowchart of a procedure of checking keep-alive in an AP according to the present invention. In Step 710, the AP starts a timer after a specific communication terminal is registered. In Step 720, the AP checks whether there is data transmission from the specific communication terminal.

In Step 740, the AP resets the timer of the Step 710 and returns to Step 710 and its subsequent procedure, when it is determined in Step 720 that there is data transmission.

Otherwise, in Step 730, the AP checks whether the timer of the Step 710 expires when checking that there is not data transmission. The AP returns to Step 720 and its subsequent procedure when the timer of the Step 710 is determined not to have expired in Step 730.

In Step 750, the AP deletes registration information on the specific communication terminal when the timer of the Step 710 is determined to have expired.

After that, the AP terminates the procedure according to the present invention.

The present invention can eliminate a procedure of unnecessarily receiving a broadcast message and responding thereto in a broadcast message processing procedure, thereby reducing power consumption and maximizing stand-by time.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for filtering a broadcast message, the apparatus comprising: a broadcast message processor for receiving a broadcast message, checking the received broadcast message, and deciding whether to transmit a response message instead of a registered communication terminal to which the broadcast message is forwarded; a keep-alive node checker for checking whether the registered communication terminal exists within a control area; and a controller for receiving a registration message from a communication terminal, performing registration for broadcast message filtering, transmitting the response message to the broadcast message instead of the registered communication terminal when the broadcast message processor permits the response and when the received broadcast message requires a response, and deleting registration information on the registered communication terminal when the keep-alive node checker determines that the registered communication terminal does not exist within the control area in order to prevent the registered communication terminal from further receiving the broadcast message.

2. The apparatus of claim 1, wherein the controller transmits a broadcast message at a Delivery Traffic Indication Message (DTIM) timer period when receiving the broadcast message.

3. The apparatus of claim 1, wherein the controller transmits the broadcast message over a data channel when the broadcast message processor permits forwarding without permitting the response.

4. The apparatus of claim 1, wherein upon registration, the communication terminal provides a keep-alive method code in a registration message and transmits the registration message to the apparatus.

5. The apparatus of claim 1, wherein after registration, the communication terminal receives a broadcast message selectively transmitted over a data channel without receiving a broadcast message over a broadcast channel.

6. The apparatus of claim 1, wherein, when the controller receives a result that the registered communication terminal does not exist from the keep-alive node checker, the keep-alive node checker does not receive a response message including a proper keep-alive check code after transmitting a keep-alive check message to the registered communication terminal.

7. The apparatus of claim 1, wherein, when the controller receives a result that the registered communication terminal does not exist from the keep-alive node checker, the keep-alive node checker checks whether a timer starting after registration of the communication terminal expires.

8. The apparatus of claim 1, wherein the broadcast message processor provides a result of the response when the received broadcast message requires the response, and the broadcast message processor provides a result of forwarding to the controller when the received broadcast message requires forwarding to the communication terminal.

9. A method for filtering a broadcast message in a wireless network access equipment, the method comprising: searching, by an Access Point (AP), for a registered communication terminal that should respond to a received broadcast message; checking, by a keep-alive node checker of the AP, whether the registered communication terminal exists within a control area; checking, by the AP, whether the received broadcast message forwarded to the searched communication terminal requires a response; transmitting, by the AP, a response instead of the communication terminal when the received broadcast message requires a response; and deleting registration information on the registered communication terminal when the keep-alive node checker determines that the registered communication terminal does not exist within the control area in order to prevent the registered communication terminal from further receiving the broadcast message.

10. The method of claim 9, further comprising:
   checking, by the AP, whether the received broadcast message requires forwarding to the communication terminal when the received broadcast message does not require a response; and
   forwarding, by the AP, the broadcast message to the communication terminal over a data channel when the received broadcast message requires forwarding.

11. The method of claim 9, wherein the searched communication terminal does not receive a broadcast message over a broadcast channel.

12. The method of claim 9, wherein the searched communication terminal receives a broadcast message selectively transmitted by the wireless network access equipment over a data channel.

13. A system for filtering a broadcast message, the system comprising: a wireless network access equipment for performing registration for a communication terminal, filtering a broadcast message for a registered communication terminal, a keep-alive node checker for checking whether the registered communication terminal exists within a control area, responding to the broadcast message instead of the registered communication terminal when requiring a response by a received broadcast message, deleting registration information on the registered communication terminal when the keep-alive node checker determines that the registered communication terminal does not exist within the control area in order to prevent the registered communication terminal from further receiving the broadcast message, and transmitting only a broadcast message, which should be necessarily received by the registered communication terminal, to the registered communication terminal over a data channel; and a communication terminal for, after being registered by the wireless network access equipment, receiving only a selective broadcast message over a data channel without receiving a broadcast message over a broadcast channel.

14. The system of claim 13, wherein the wireless network access equipment deletes registration information on the registered communication terminal when checking whether the registered communication terminal exists in a control area.

15. A non-transitory computer-readable recording medium having recorded thereon a program for filtering a broadcast message, comprising; a first code segment, for searching for a registered communication terminal that should respond to a received broadcast message; a second code segment, for checking whether the received broadcast message forwarded to the searched communication terminal requires a response; a third code segment, for a keep-alive node checker for checking whether the registered communication terminal exists within a control area; a fourth code segment, for transmitting a response instead of the communication terminal when the received broadcast message requires a response; and a fifth code segment, for deleting registration information on the registered communication terminal when the keep-alive node checker determines that the registered communication terminal does not exist within the control area in order to prevent the registered communication terminal from further receiving the broadcast message.

16. The non-transitory computer-readable recording medium of claim 15, further comprising;
   a fourth code segment, for checking whether the received broadcast message requires forwarding to the communication terminal when the received broadcast message does not require a response; and
   a fifth code segment, for forwarding the broadcast message to the communication terminal over a data channel when the received broadcast message requires forwarding.

* * * * *